Jan. 1, 1929.
H. E. TAUTZ
1,697,669
TRUNNION CONSTRUCTION
Filed Jan. 26, 1928
2 Sheets-Sheet 1
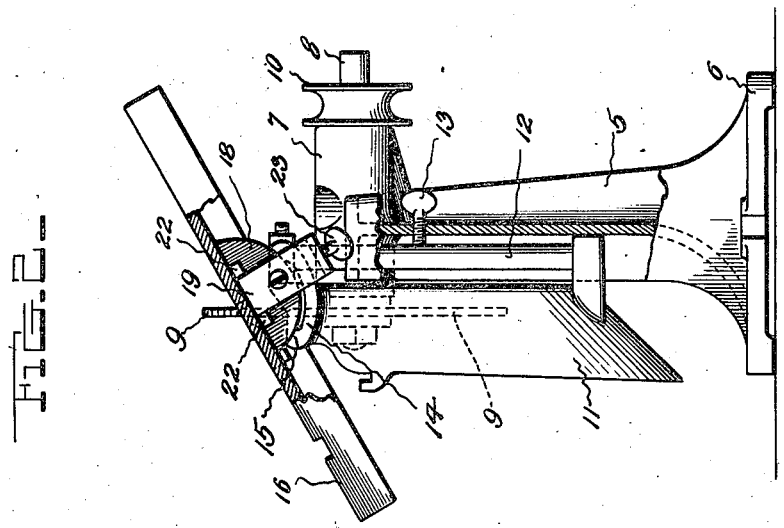
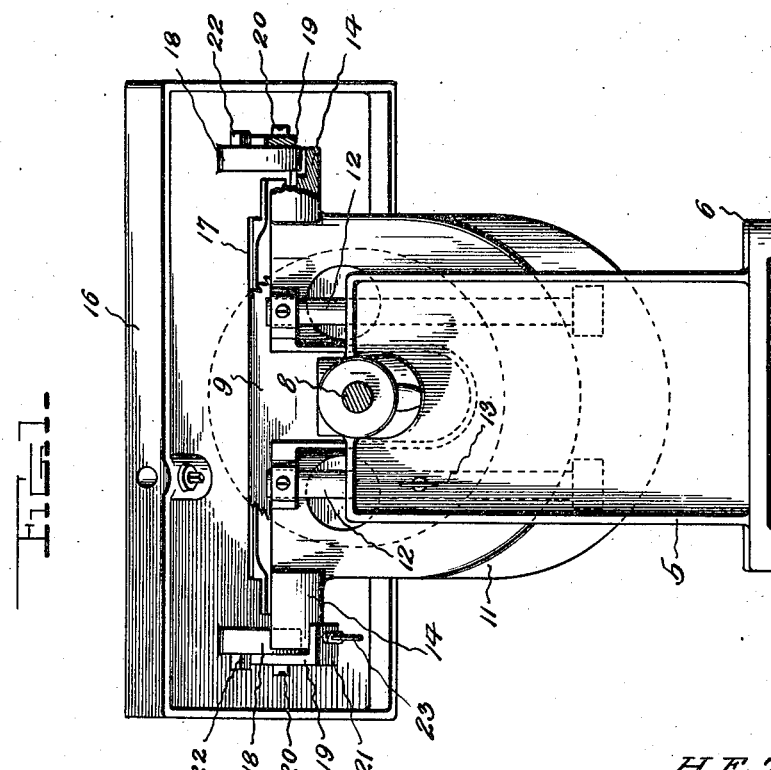
INVENTOR.
*H. E. Tautz.*
BY *Townsend & Townsend*
ATTORNEYS.

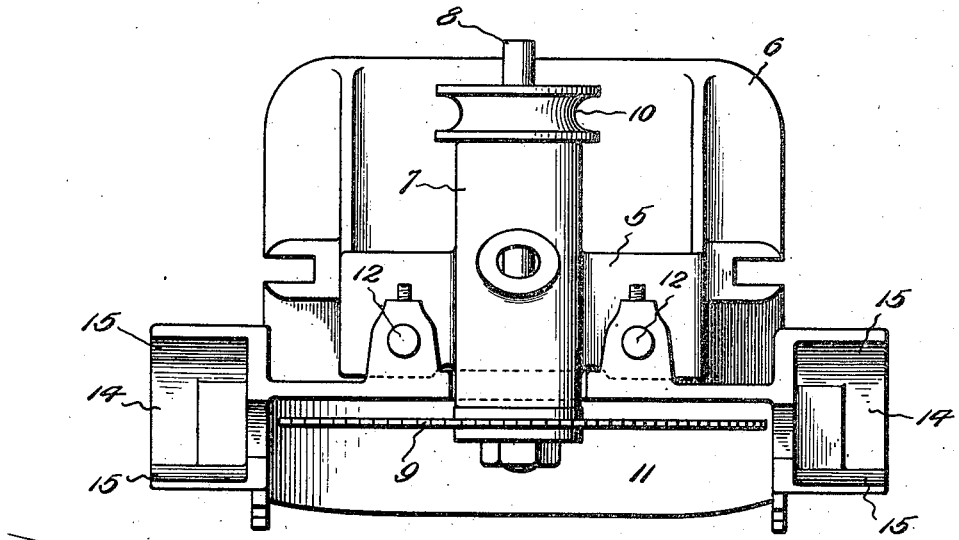
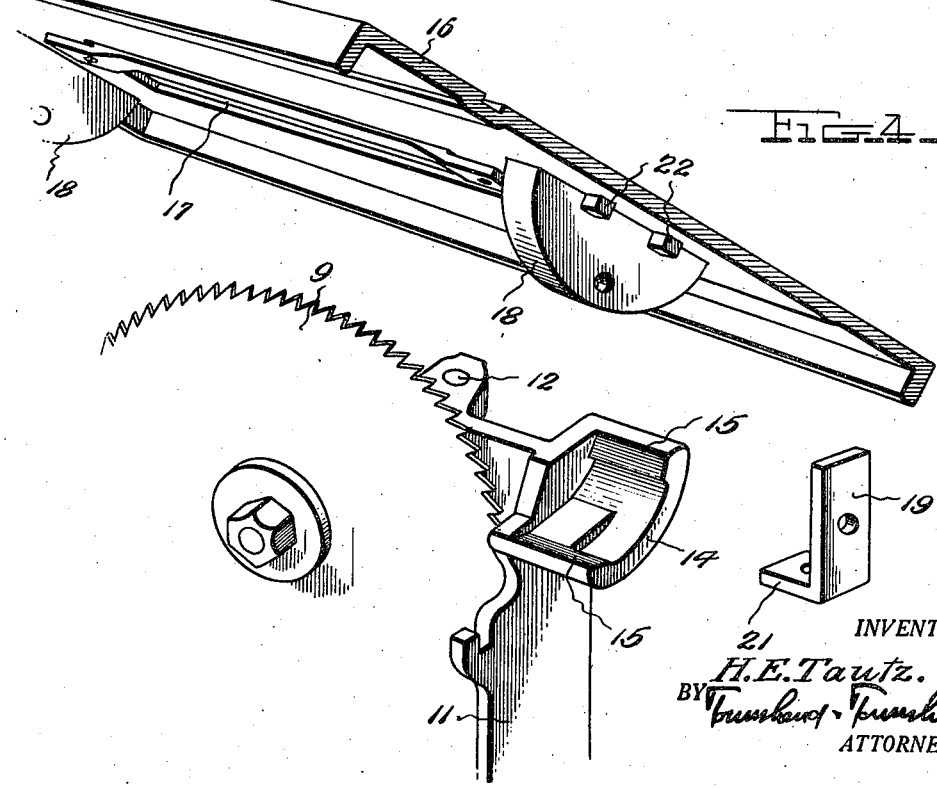

Patented Jan. 1, 1929.

1,697,669

UNITED STATES PATENT OFFICE.

HERBERT E. TAUTZ, OF MILWAUKEE, WISCONSIN, ASSIGNOR TO THE DELTA MANUFACTURING COMPANY, OF MILWAUKEE, WISCONSIN, A CORPORATION OF WISCONSIN.

TRUNNION CONSTRUCTION.

Application filed January 26, 1928. Serial No. 249,720.

This invention relates to a trunnion construction for use in connection with saw tables having in view as one of its objects the provision of a simplified trunnion construction wherein a definite fixed relation may be maintained at all times between a tool element and a tilting table regardless of the angle of inclination which the table may assume.

Other objects of the invention are; the provision of a trunnion mounting in the form of a casting; the provision of trunnion means for automatically centering the saw blade in the slot of a saw table regardless of the angle at which the table is inclined; and generally the provision of a novel and improved form of trunnion construction for the tops of saw tables and the like wherein the top is adapted for tilting in planes inclined to the horizontal.

With these, and such other objects in view as will be apparent from the description, the invention resides in the novel construction, combination and arrangement of parts hereinafter described and claimed and illustrated in the accompanying drawings, wherein a practical, physical embodiment of the principles of the invention is shown.

Figure 1 is a side elevation of a tilting saw table with the top in tilted position.

Figure 2 is an end elevation thereof, partly in section, as from the left of Figure 1.

Figure 3 is a plan view of the table standard with the table top removed.

Figure 4 is a group perspective illustrating details of assembly.

In practically all details the structure illustrated comprises a conventional table construction wherein as shown in Figures 1 to 4, inclusive, a casting standard 5 is equipped with a horizontal base 6, the standard being formed at its upper end with a bearing 7, and receiving horizontally therethrough the operating shaft 8 of a rotary saw blade 9, the driving power therefor being imparted through a pulley 10 rigidly attached to the shaft 8 and bearing against one end of the bushing 7.

Below the table top the saw blade 9 is substantially covered by a guard member 11 of the vertically elevating type having vertical posts 12 as a rigid structural unit thereof adapted for vertical movement through suitable bushings formed in the upper end of the upright 5. Suitable clamping means 13, comprising in the present instance a set screw, are provided in the upright for engaging the rods 12 to maintain the guard 11 in the desired vertical adjustment relative to the supporting standard 5.

A feature of the invention resides in the bearing construction at the upper end of the guard member 11. This is best illustrated in Figure 3. The casting comprising the guard 11 is formed at each end of its top with an outward laterally extending integral casting 14 of substantially arcuate formation and having at each side edge relative to the longitudinal length of the casting, raised portions 15 which have bearing surfaces formed in the true circumference of a circle later to be described. These bearing castings 14 extend for substantially one half of their area laterally of the guard casting 11 and over the top of the upright 5 when in assembled position, as best shown in Figure 2.

Seated at the top of the assembly is the conventional saw table 16 provided with the usual longitudinally extending slot 17 for receiving the saw blade 9 therethrough and in which the inner side edge of the slot 17 is disposed coincident with the longitudinal meridian of the table top. At each end of the table top and cooperating with the bearings 14, the table top has its under face formed with integral castings in the form of semicircular trunnions 18, the peripheries of which have a true bearing contact against the bearing faces 15 of the trunnion supports 14. The periphery of each of the trunnions 18 and the bearing faces 15 of the trunnion supports 14 are disposed in the true circumference of a circle having its axis disposed coincident with the longitudinal meridian of the table top and corresponding accordingly with the inner edge of the slot 17. This construction insures an absolute centering of the slot 17 relative to the saw blade 9 extending vertically therethrough irrespective of the angle of inclination of the top 16. This is so by reason of the fact that the fulcrum point of the trunnions lies in the axis of a circle, the circumference of which coincides with the periphery of the trunnions.

As one means of anchoring the table top 16 at any desired angle to the horizontal, I provide on the outer vertical face of each trunnion 18, a substantially L-shaped bracket 19 having its long arm detachably secured by suitable fastening elements 20 to the outer face of the trunnion in such position that the short arm 21 is inturned under the adjacent support 14. The bracket 19 is disposed at a right angle to the table top 16 and this position of the bracket is maintained by the provision of stop lugs 22 formed on the bottom face of the table top outwardly of each trunnion 18 to engage opposite edges of the bracket 19, as best shown in Figure 2. A clamping screw 23 is threaded through the short arm 21 of each bracket 19 for clamping engagement against the under face of its adjacent support 14 whereby upon tightening of the clamping screw 23, the trunnion will be clamped against its seat 14 to bind the table top in the desired anchored position relative to the saw 9. The raised portions 15 at the side edges of the bearings 14 cooperate with the table top 16 to provide stops for limiting the directional movement thereof, the portion 15 which extends over the upper edge of the standard 5 being elevated relative to the opposite edge portion 15, as best shown in Figure 2, and defining the horizontal level of the table top. The lower edge portion 15 of each of the bearings 14 determines the greatest inclination which the table top may assume relative to the vertical saw blade 9, contacting with the under face of the table top for the purpose.

I claim:

1. A trunnion construction comprising a support, a casting carried by said support and formed with a bearing socket, a movable member, a semicircular casting carried by said movable member for bearing engagement in said support bearing, a bracket on said semicircular casting, and means in said bracket for clamping engagement against said casting bearing for adjusting said movable member at an incline relative to said support.

2. In a trunnion construction for tilting top tables, a support, a tilting table top, a trunnion carried by said top and having a bearing in said support and means carried by said top for imparting clamping pressure against said bearing radially of the trunnion.

3. In a tilting table top construction, a support, a table top movable for inclination relative thereto, a substantially semicircular trunnion carried by said table top, a bearing therefor carried by said support, a bracket carried by said trunnion and having a portion extending under said bearing, and means carried by said extending portion of the bracket for clamping engagement against said bearing.

In testimony whereof I affix my signature.

HERBERT E. TAUTZ.